United States Patent
Martin et al.

(10) Patent No.: US 8,686,734 B2
(45) Date of Patent: Apr. 1, 2014

(54) SYSTEM AND METHOD FOR DETERMINING RADIO FREQUENCY IDENTIFICATION (RFID) SYSTEM PERFORMANCE

(75) Inventors: Ernest Lloyd Martin, Orlando, FL (US); John David Worrall, Clermont, FL (US); Peter Andrew Stepniewicz, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 437 days.

(21) Appl. No.: 12/703,341

(22) Filed: Feb. 10, 2010

(65) Prior Publication Data

US 2011/0193958 A1   Aug. 11, 2011

(51) Int. Cl.
  *G01R 31/00* (2006.01)
  *G08B 13/14* (2006.01)

(52) U.S. Cl.
  USPC ........................................ 324/501; 340/572.1

(58) Field of Classification Search
  USPC ............ 324/501, 500; 340/572.1, 572.4, 540, 340/500, 10.1, 10.4, 568.1; 455/41.1, 41.2, 455/500
  See application file for complete search history.

(56) References Cited

U.S. PATENT DOCUMENTS

| | | | | |
|---|---|---|---|---|
| 7,154,283 B1 * | 12/2006 | Weakley et al. | ......... | 324/756.01 |
| 7,161,489 B2 * | 1/2007 | Sullivan et al. | ............ | 340/572.4 |
| 7,432,718 B2 * | 10/2008 | Ishihara et al. | ............... | 324/457 |
| 8,310,379 B2 * | 11/2012 | Johnson | ......................... | 340/988 |
| 2005/0207617 A1 * | 9/2005 | Sarnoff | ......................... | 382/103 |
| 2005/0246094 A1 * | 11/2005 | Moscatiello | .................. | 701/207 |
| 2006/0049249 A1 * | 3/2006 | Sullivan | ........................ | 235/385 |
| 2006/0265123 A1 * | 11/2006 | Chon et al. | ..................... | 701/209 |
| 2007/0206832 A1 * | 9/2007 | Gordon et al. | ................ | 382/103 |
| 2007/0229268 A1 * | 10/2007 | Swan et al. | ................ | 340/572.1 |
| 2008/0231926 A1 * | 9/2008 | Klug et al. | ....................... | 359/23 |
| 2008/0251575 A1 * | 10/2008 | Bowling et al. | ............... | 235/375 |
| 2010/0026470 A1 * | 2/2010 | Wilson et al. | ............... | 340/10.52 |
| 2010/0173582 A1 * | 7/2010 | Han | ............................. | 455/41.1 |
| 2010/0321246 A1 * | 12/2010 | Troesken et al. | .............. | 342/463 |

\* cited by examiner

*Primary Examiner* — Hoai-An D Nguyen
(74) *Attorney, Agent, or Firm* — Ference & Associates LLC

(57) ABSTRACT

A system for determining radio frequency identification (RFID) performance includes a radio frequency identification (RFID) system having at least one antenna and at least one reader configured to receive an RF indication from an RFID tag and is configured to provide RFID data and an RFID time stamp relating to the at least one antenna. A motion capture video system has at least one camera and a processing system including a recognizable element located proximate to the RFID tag and is configured to provide position data relating to the position of the recognizable element and a motion capture time stamp. An RFID/motion capture system is configured to receive the RFID data, the RFID time stamp, the position data relating to the recognizable element and the motion capture time stamp and to correlate the RFID data and the position data and provide a correlated RFID and motion capture signal.

20 Claims, 8 Drawing Sheets

SYSTEM AND METHOD FOR DETERMINING RADIO FREQUENCY IDENTIFICATION (RFID) SYSTEM PERFORMANCE

BACKGROUND

The use of radio frequency identification (RFID) systems for locating objects is becoming widespread in a variety of industries. RFID systems are used to locate and track objects, track item inventory, monitor the location of individual units, and a myriad of other uses. RFID systems generally work by placing an RFID sensor, sometimes referred to as a "tag" or an "RFID tag" on an object and then sensing the presence of the tag using one or more antennas coupled to an RFID reader system. The antennas can be placed in and around certain areas in which it is desired to monitor for the presence of an RFID tag.

When designing an RFID system, it is important to consider factors that affect the performance of the RFID system. One such factor is the ability of the antenna, or antenna array if multiple antennas are used, to accurately determine the presence and location of an RFID tag within a volume. Factors that affect the antenna system's ability to detect the RFID tag include, but are not limited to, the speed at which the RFID tag enters the area covered by the antenna system, the proximity of the RFID tag to a wearer if the tag is attached to an individual, the presence of structures that may affect the RF spectrum, field shape, and connection, and other factors.

Therefore, it would be desirable to have a system that can monitor and determine the performance of an RFID system.

SUMMARY

Embodiments of the invention include a system for determining radio frequency identification (RFID) performance. The system includes a radio frequency identification (RFID) system comprising at least one antenna and at least one reader configured to receive an RF indication from an RFID tag, the RFID system configured to provide RFID data and an RFID time stamp relating to the at least one antenna. The system also includes a motion capture video system comprising at least one camera and a processing system, the motion capture video system also comprising a recognizable element located proximate to the RFID tag, the motion capture video system configured to provide position data relating to the position of the recognizable element and a motion capture time stamp. The system also includes an RFID/motion capture system configured to receive the RFID data and the RFID time stamp from the RFID system, the RFID/motion capture system also configured to receive the position data relating to the position of the recognizable element and the motion capture time stamp from the motion capture video system, the RFID/motion capture system also configured to correlate the RFID data from the RFID system and the position data relating to the position of the recognizable element from the motion capture video system and provide a correlated RFID and motion capture signal.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Embodiments of the system and method for determining radio frequency identification (RFID) system performance will be described herein in the context of a system that monitors the presence and location of an individual wearing an RFID tag in a particular volume. However, embodiments of the system and method for determining RFID system performance are applicable to any RFID system in which it is desirable to characterize, monitor and maintain the performance of the system.

Figure 1:
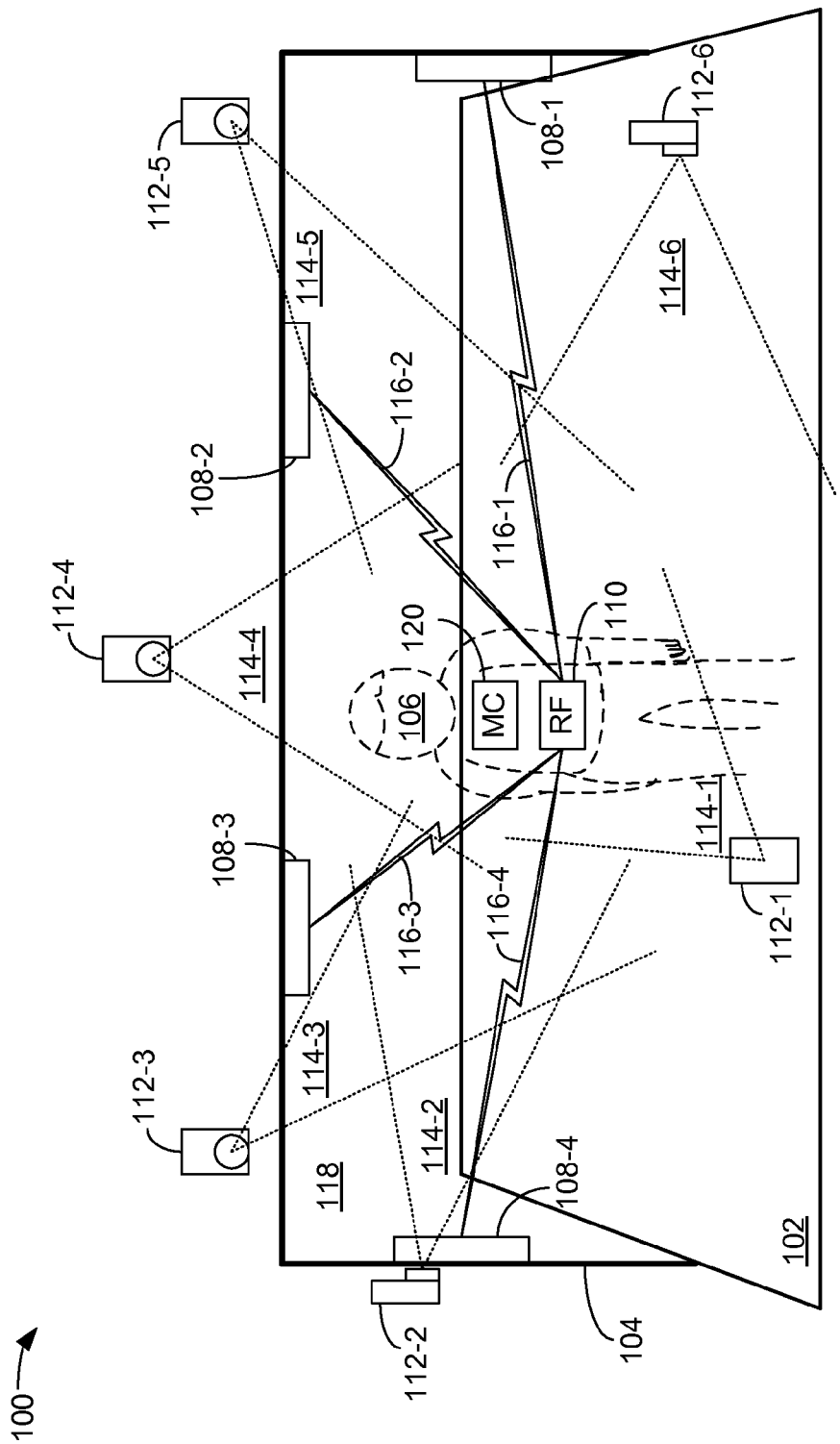
FIG. 1 is a diagram illustrating an environment in which an embodiment of the system for determining RFID performance operates.

FIG. 1 illustrates an environment in which an embodiment of the system for determining RFID performance operates. The environment 100 represents a real-time user environment. In an embodiment, the environment 100 is a physical volume within which the real-time user is physically located and participating, performing or engaged in an activity. For example, the environment 100 can be an admission line to a theme park or a theme park attraction where it is desirable to observe a volume with an RFID reader system and determine the performance of the RFID system.

A visual representation or image of the environment 100 can be captured by a motion capture system and represented on a monitor by a computer or other type of computing device to visually depict operating parameters and performance of an RFID system. In an embodiment, the environment 100 is covered by an RFID system and is also captured by a motion capture system. An image of the environment 100 is displayed on a computer monitor to aid in determining the performance of the RFID system.

The environment 100 comprises a surface 102 and a structure 104. In an example, the surface 102 can be a floor and the structure 104 can be a gantry or other support structure that supports a number of RFID antennas 108. In the example shown in FIG. 1, four RFID antennas 108-1, 108-2, 108-3 and 108-4 are supported on the structure 104 to cover a volume 118. The volume 118 is a three-dimensional space of arbitrary size and shape where an individual 106 can be monitored. As an example, the volume 118 may be a room, a portion of a room, a passageway, an entry, an exit, an elevator, or any other space. Other numbers of RFID antennas 108 can be used to cover volumes having different sizes. In the embodiment shown in FIG. 1, the lines 116-1, 116-2, 116-3 and 116-4 illustrate electronic radio frequency (RF) communication between the RFID tag 110 and antennas 108-1, 108-2, 108-3 and 108-4, respectively. Although the RFID tag 110 may be in communication with one or more antennas 108, it is not necessary that the RFID tag 110 be in simultaneous RF communication with all of the available antennas 108.

The environment 100 also includes a number of motion capture devices. The motion capture devices can be any devices that can locate an object in the environment 100. In an embodiment, the motion capture devices are cameras 112. In the example shown in FIG. 1, six cameras, 112-1, 112-2, 112-3, 112-4, 112-5 and 112-6 are arranged about the volume 118 in positions to capture images from substantially all of the volume 118. Details of the mechanical support of the cameras 112 are not shown for ease of illustration. The motion capture devices can be ones that operate in the visible or non-visible spectrum, such as infrared (IR), radio frequency (RF) or acoustic (e.g., ultrasonic). While six cameras 112 are shown, these quantities are not limiting. One or more cameras 112 can be used, depending upon the needs of a particular application. Each camera 112 has a related camera field of view 114. Each camera field of view 114 provides at least a portion of the motion capture coverage of the volume 118 so that the movement of a recognizable element 120 in the volume 118 can be captured and recorded.

In the embodiment shown in FIG. 1, an individual 106 wears an RFID tag 110 and wears a recognizable element 120 located in relatively close proximity to the RFID tag 110. For example, the RFID tag 110 can be any RFID tag, and typically comprises a wristband, card, wearable pin, key fob, or other article that can be worn or carried, and that includes a passive, an active, or a hybrid circuit that communicates electronically with one or more of the RFID antennas 108. In an embodiment using infrared technology, the recognizable element 120 can be, for example, an element that is visible in the infrared (IR) spectrum (e.g., an infrared emitter, infrared reflector and the like), and the cameras 112 can be sensitive to infrared energy emitted or reflected by the recognizable element 120. However, any object location tracking system could be used to determine the physical location and motion telemetry data, i.e., X, Y, Z position data and time stamp of the recognizable element. In an embodiment, IR technology is employed because of its simplicity and small form factor cameras. There are several other types of object location tracking technologies that are suitable for implementation of the present invention, such as those that use radio frequency, acoustic (e.g., ultrasonic), and optical (e.g., video and still image analysis) technologies. Further, other analysis techniques, such as triangulation, time of flight, refraction, calibrated object size, reflected/emitted energy intensity analysis, etc., may be used to perform object motion tracking.

In accordance with an embodiment, the motion capture devices capture the location and movement of the recognizable element 120; simultaneously, the RFID reads occur between the RFID tag 110 and one or more of the antennas 108. The RFID read data and RFID time stamp from the RFID system are correlated with the positional data and motion capture time stamp of the recognizable element 120. The correlated information is then used to develop an output that can be used to create a number of different visualizations of the performance of the RFID environment 100.

Figure 2:
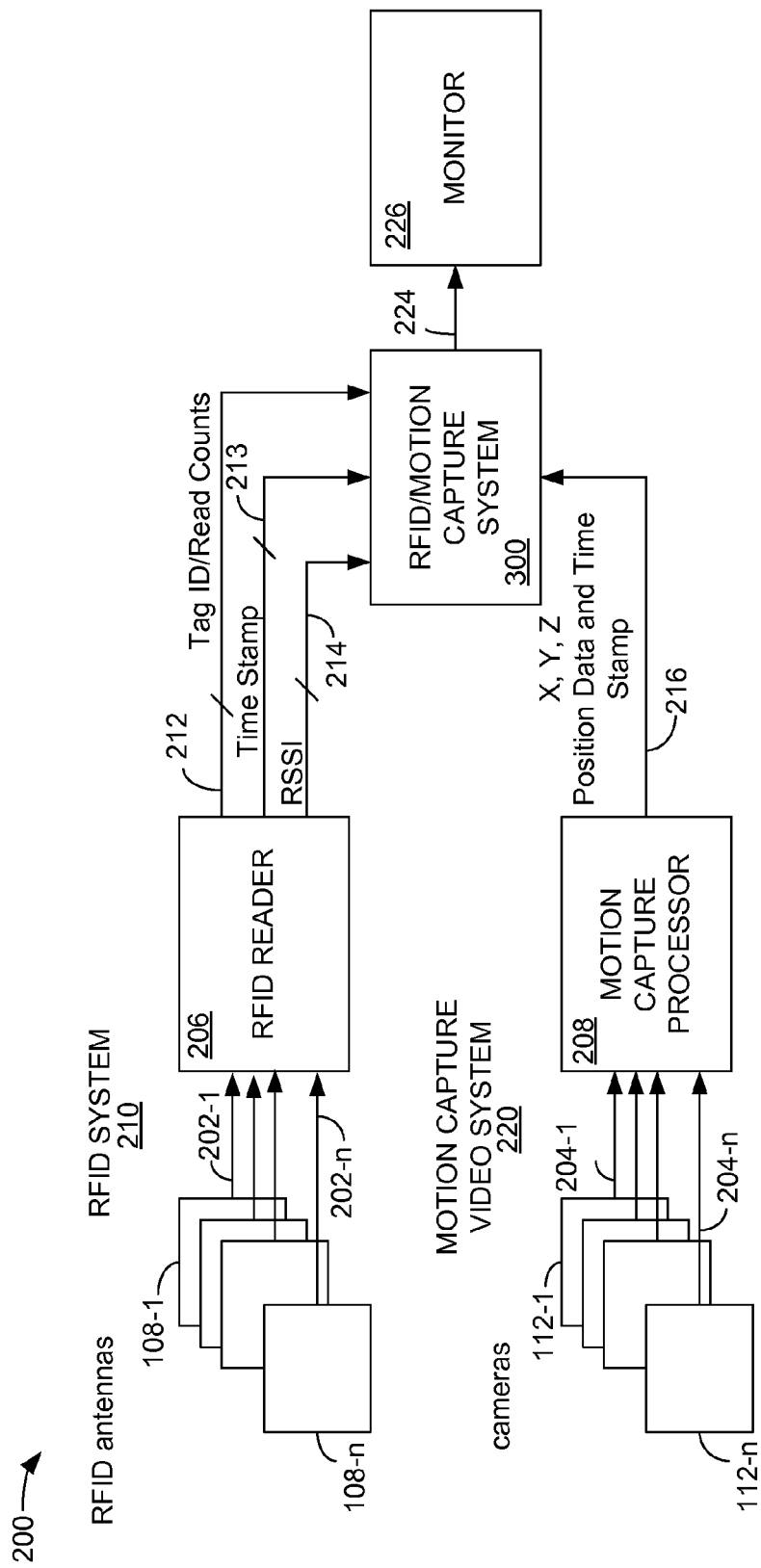
FIG. 2 is a block diagram illustrating an embodiment of a system for determining RFID system performance.

FIG. 2 is a block diagram illustrating an example of an RFID performance monitoring system 200 in accordance with an embodiment of the present invention. The system 200 comprises a plurality of RFID antennas 108-1 through 108-$n$. Each of the RFID antennas 108 provides a signal over a channel 202-1 through 202-$n$, respectively, to an RFID reader 206. The RFID antennas 108 and the RFID reader 206 generally comprise an RFID system 210, as known in the art. The RFID reader 206 can be implemented using a combination of hardware and software. The software can be executed by a microprocessor having memory that can execute instructions and that can run on any available programmable general purpose microprocessor. The RFID reader 206 develops a data stream containing RFID data from antennas 108. In an embodiment, a tag ID, the number of read counts (reads per second (rps)), an RFID time stamp, and the return signal strength indicator (RSSI) of each antenna 108 is provided from the RFID reader 206 to the RFID/motion capture system 300; however, these parameters are not limiting. For example, the RFID data may include any data stored on RFID tag 110 as well as data determined by or measured by RFID tag 110 including biometric data, environmental data, historical data, transaction data, account data and the like. The tag ID and read counts can be provided over coupling 212, the RFID time stamp can be provided over coupling 213, and the RSSI for each antenna can be provided over coupling 214. In the embodiment shown in FIG. 2, although the couplings 212, 213 and 214 are shown as single couplings, the signals on couplings 212, 213 and 214 can be multiplexed, or otherwise combined, onto a single channel or can be provided over a network interface.

The system 200 also includes a plurality of cameras 112-1 through 112-$n$ that each provide a video signal over respective connections 204-1 through 204-$n$, to a motion capture processor 208. The cameras 112 are coupled to each other and to the motion capture processor 208, so that all cameras 112 are synchronized to the same time reference. The cameras 112 and the motion capture processor 208 generally comprise a motion capture video system 220, as known in the art. The motion capture processor 208 can be implemented using a combination of hardware and software. The software can be executed by a microprocessor having memory that can execute instructions and that can run on any available programmable general purpose microprocessor.

The motion capture processor 208 captures frame data from the cameras 112 and analyzes the frames for evidence of the recognizable element 120. When the recognizable element 120 is recognized, the motion capture processor 208 calculates and records the position data and develops X, Y and Z (volume) position data and records a motion capture time stamp indicting the time at which the recognizable element 120 was recognized. The cameras 112 capture the two-dimensional (X and Y position) location of the recognizable element 120 for each frame. For each frame in which the recognizable element 120 is present, the camera 112 also sends a motion capture time stamp corresponding to the time at which the recognizable element 120 is recognized. Each camera 112 is synchronized to a clock and the location of each camera 112 is known. The motion capture processor 208 defines a three-dimensional (X, Y and Z) location of the recognizable element 120 based on the two-dimensional X and Y position information and the motion capture time stamp information, preferably from at least three cameras 112.

This most recent position data and motion capture time stamp data is cached for possible correlation to RFID read data and represents the last known location of the recognizable element 120. This X, Y and Z position data and the motion capture time stamp are provided over coupling 216 to the RFID/motion capture system 300.

The RFID time stamp is compared with the motion capture time stamp and associated X, Y and Z position data from the motion capture processor 208 in the RFID motion capture system 300. In a real-time processing example, when the RFID time stamp differs from the motion capture time stamp by an amount that exceeds a predetermined amount of time, then the motion capture video system 220 is said to have lost track of the recognizable element 120 and the RFID read data is discarded. In an asynchronous processing example, RFID read data is only used when there is a suitable match between the RFID read data time stamp and a motion capture time stamp. The predetermined amount of time can also be viewed as an expiration interval for the validity of the motion capture frame data. The expiration interval ensures that when the X, Y and Z position data from the motion capture processor 208 is paired with the RFID read data from the RFID reader 206, the concurrency of their respective captures is sufficient, i.e. the RFID time stamp and the motion capture time stamp are sufficiently close to each other in time that it is "accurate" to model the RFID tag 110 to have been at the location given by the motion capture system 220 when the RFID tag 110 was read by the RFID reader 206. In an embodiment, the expiration interval can range from a few milliseconds to as long as a few seconds.

The RFID time stamp and the motion capture time stamp are fixed. However, the expiration interval of the motion capture frame data (i.e., the predetermined time difference between the RFID time stamp and the motion capture time stamp) can be adjusted to optimize the system under certain circumstances. For example, using object speed as a variable, if the system observes through its tracking of the motion capture data over time that an RFID tag 110 is moving "slowly," then it may be appropriate to increase the expiration interval, thus allowing the system to potentially capture and retain more read points, knowing that the loss in accuracy is small because the RFID tag 110 cannot have moved very far from its last observed location as it is not moving very quickly. From a business rule standpoint, the expiration interval might vary for a number of reasons. One example might be that for a particular analysis, the capture volume is partitioned off into discrete regions (e.g. a target region where it is desirable to read RFID tags, and an exterior region where RFID tag reads are not desired), and in this instance the interval might vary based on the proximity of the RFID tag, for example if it is clear that the RFID tag is in one region or the other, then we would likely increase the interval to favor counting that read data. Whereas if the RFID tag is somewhere near the border of the two regions, then the expiration interval may be shortened to minimize the chance of counting an RFID read toward the undesired region.

When the RFID time stamp differs from the motion capture time stamp by an amount that is less than the predetermined amount, then the X, Y and Z position data from the motion capture video system 220 is correlated with the RFID read data and the correlated data is provided over connection 224. The combined output can be formatted for display on a monitor 226. Referring back to FIG. 1, when the individual 106 wears the recognizable element 120 in close proximity to the RFID tag 110, the location and movement of the recognizable element 120, and hence, the individual 106, can be portrayed when the system 200 creates a visual representation of the recognizable element 120 combined with the RFID tag 110.

Figure 3:
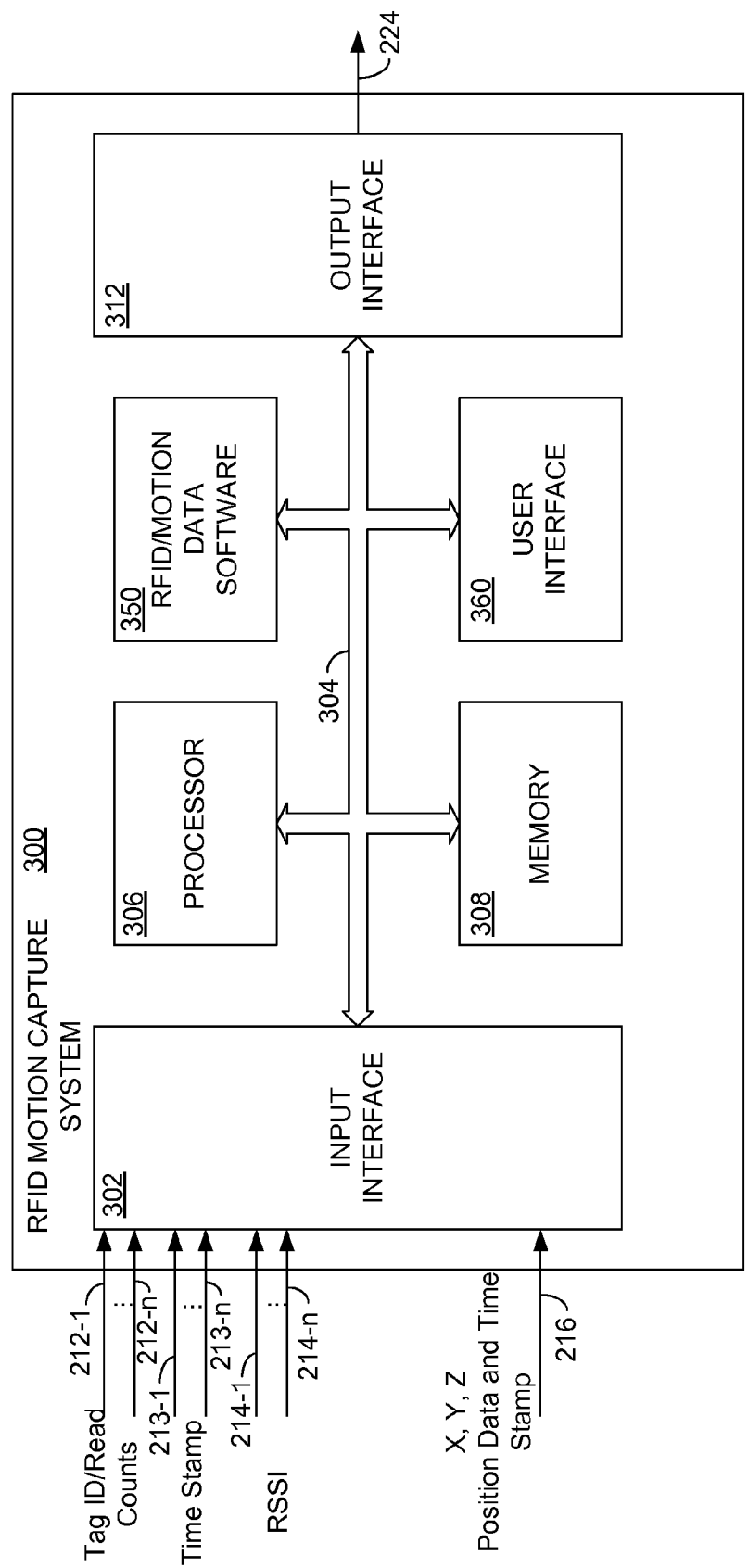
FIG. 3 is a block diagram illustrating an embodiment of the RFID motion capture system of FIG. 2.

FIG. 3 is a block diagram illustrating an embodiment of the RFID motion capture system 300 of FIG. 2. The system 300 can be implemented on any general purpose processing device, such as a personal computer, or can be implemented on another combination of processor and memory. For example, the system 300 can be implemented on a laptop computer, or can be implemented on a server computer that may or may not be co-located with the RFID system 210 and the motion capture video system 220.

The system 300 includes an input interface 302, a processor 306, a memory 308, RFID/motion data software 350, a user interface 360, and an output interface 312 coupled together over a system bus 304. The system bus 304 allows interoperability between and among the coupled elements. The memory 308 can be any type of volatile or non-volatile memory that can store instructions, such as the instructions that define the RFID/motion data software 350. The processor 306 can be any type of general purpose processor that can execute the instructions that define the RFID/motion data software 350. The input interface 302 receives the tag ID and read counts over lines 212-1 through 212-n, the RFID time stamp over lines 213-1 through 213-n, the RSSI signals over lines 214-1 through 214-n, and the X, Y and Z position data and a motion capture time stamp relating to the recognizable element 120 over connection 216.

The RFID motion data software 350 compares the RFID time stamp with the motion capture time stamp. If the RFID time stamp differs from the motion capture time stamp by an amount that is less than the predetermined amount, then the X, Y and Z position data from the motion capture video system is correlated with the RFID read data and the correlated data is provided by the output interface 312 over connection 224. The RFID motion data software 350 uses the comparison of the RFID time stamp with the motion capture time stamp to correlate the RFID data with the motion data to provide a correlated RFID and motion capture data stream over line 224 when the two time stamps differ by less than a predetermined amount. The information on line 224 includes a data stream that comprises the "history" of the RFID tag reads of the recognizable element 120 and its X, Y and Z position data at a specified time. The information on line 224 can be used/applied to a variety of applications, business rules, analytics, visualizations and loggings. The information on line 224 can be used to develop a video stream that can be used as the basis from which to develop a number of visualization tools that can be used to visualize and quantify the performance of an RFID system.

The user interface 360 provides a vehicle through which the visualizations may be presented to a user in a variety of formats, including, for example, graphs, videos, etc., based on user interaction and user preference. In alternative embodiments, the user interface may be external to the system 300.

Figure 4:
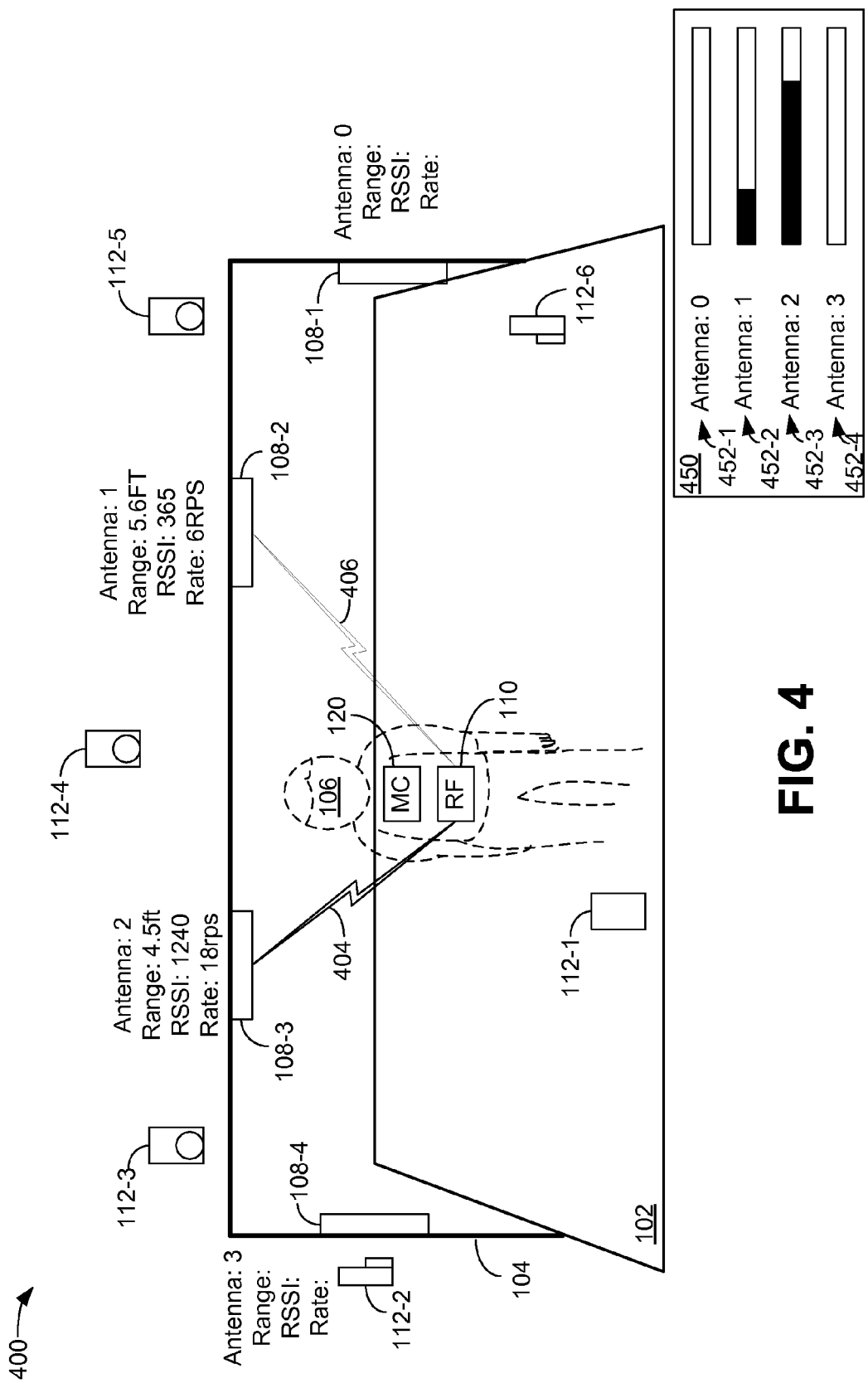
FIG. 4 is a graphical illustration showing a visualization of RFID system performance generated by the RFID motion data software of FIG. 3.

FIG. 4 is a graphical illustration 400 showing a visualization of RFID system performance generated by the RFID motion data software 350 of FIG. 3. The illustration 400 shows a representation of environment 100 shown in FIG. 1 including an individual 106 wearing an RFID tag 110 and a recognizable element 120 in close proximity to the RFID tag 110. In some embodiments, the individual need not be shown in the visualization 400 and instead, a marker or other indicia indicating the location of the recognizable element 120, and through its close proximity, the RFID tag 110 can be depicted in the representation of volume 118 (FIG. 1). The elements depicted in visualization 400 appear in locations generally corresponding to locations of corresponding elements in the physical environment 100 that is being depicted.

In the embodiment shown in FIG. 4, the RFID tag 110 is within reception range of the antenna 108-2 and the antenna 108-3. As shown in FIG. 4, distance (also referred to as "range" in FIG. 4), RSSI and read rate information in reads per second (rps) is depicted for each antenna. In addition, the range of each RFID tag to an antenna for a particular read event can be determined based on the strength of the RSSI signal. The line 404 is show in bolder print than the line 406 to indicate that the RF connection between the RFID tag 110 and the antenna 108-3 is stronger than the RF connection between the RFID tag 110 and the antenna 108-2. Alternatively, different colors can be used to indicate relative differences between the connections; and in some embodiments, each read or a fraction of a number of reads can be depicted using an occurrence of a line, similar to the lines 404 and 406, between the RFID tag 110 and each antenna 108.

If the RFID tag 110 moves within the volume 118 so that an RF connection is established between the RFID tag 110 and either the antenna 108-1 or the antenna 108-4, then a visual indicator showing such connection would be shown in the illustration 400. Further, the connection indicators can also be depicted to pulse with each RFID read event, or with a frequency determined by the user.

As part of a user interface 360, only portions of which are shown in FIG. 4, the illustration 400 also includes an antenna monitor 450. The antenna monitor 450 includes a bar graph 452-1, 452-2, 452-3 and 452-4 corresponding to each of the antennas 108-1, 108-2, 108-3 and 108-4, respectively. The bar graphs 452-1 through 452-4 show the relative signal strength of the RF connection between the RFID tag 108 and whichever antenna the RFID tag 110 has a connection with. For example, the bar graph 452-2, corresponding to the antenna 108-2, shows a relatively weak RF connection compared to the RF connection shown in bar graph 452-3, which corresponds to the antenna 108-3. Further, the user interface 360 can be built to show the relative signal strength for the graphs 452-1 through 452-4 in different colors that correspond to the relative signal strength. In this manner, the signal strength between the RFID tag 110 and any or all of the antennas can be viewed at a glance on a monitor, or other type of interface.

Figure 5:
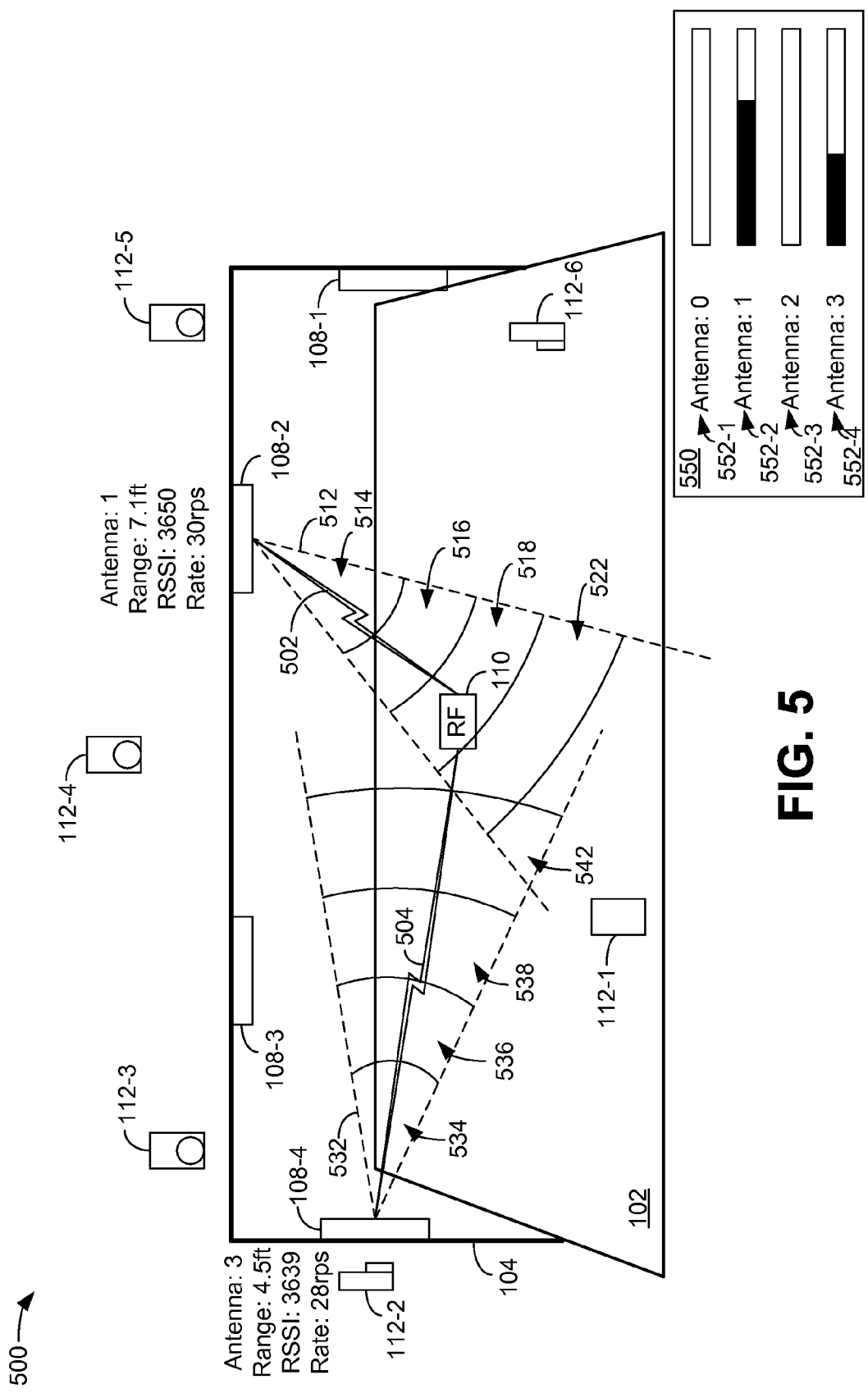
FIG. 5 is a graphical illustration showing a visualization of RFID system performance generated by the RFID motion data software of FIG. 3, relative to individual antenna performance.

FIG. 5 is a graphical illustration 500 showing a visualization of RFID system performance generated by the RFID motion data software 350 of FIG. 3, relative to individual antenna performance. In the embodiment shown in FIG. 5, the RFID tag 110 is shown as a graphical depiction without the user 106 to illustrate how the user interface 360 may be adapted to visualize the system. The RFID tag 110 is shown as being within range of the antenna 108-2 and within range of the antenna 108-4, indicating successful read events with each of those respective antennas. The line 502 indicates a read between the RFID tag 110 and the antenna 108-2, and the line 504 illustrates a read occurring between the RFID tag 110 and the antenna 108-4.

Also depicted is a visualization cone 512 related to (shown as emanating from) the antenna 108-2. The visualization cone 512 depicts the antenna pattern of the antenna 108-2. Based on the strength of the signal between the RFID tag 110 and the antenna 108-2, the RFID motion data software 350 generates and displays the location or locations of RFID tag reads occurring within regions of the visualization cone 512. For example, the visualization cone 512 includes a first region 514, a second region 516, a third region 518, and a fourth region 522. The read of the RFID tag 110 is shown as predominantly located within the region 518. Referring to the antenna monitor 550, the bar graph 552-2 related to the antenna 108-2 shows a particular signal strength relative to the RFID tag 110 being read in region 518. With other factors such as the presence of interfering structures between the RFID tag 110 and the antennas 108, the position of the RFID tag 110 relative to an individual (not shown), etc., being equal, this signal strength would be stronger were the RFID tag 110 closer to the antenna 108-2 (e.g., in region 514 or region 516) and weaker were the RFID tag 110 further away from the antenna 108-2 (e.g., in region 522). Further, a successful read is likely to occur so long as the RFID tag 110 remains within the physical locations in environment 100 that are depicted by visualization cone 512.

Similarly, a visualization cone 532 is shown emanating from the antenna 108-4. The visualization cone 532 includes regions 534, 536, 538 and 542, which are similar to the regions described above regarding the visualization cone 512. As shown by the antenna monitor 550, the signal strength shown by the bar graph 552-4 indicates a weaker connection between the RFID tag 110 and the antenna 108-4 than that shown by the bar graph 552-2 showing the strength of the signal between the RFID tag 110 and the antenna 108-2. This is so because the RFID tag 110 is farther away and in a more outlying region in the visualization cone 532 than it is in the visualization cone 512 relative to the antenna 108-2. With other factors such as the presence of interfering structures between the RFID tag 110 and the antennas 108, the position of the RFID tag 110 relative to an individual (not shown), etc., being equal, the performance visualization shown in FIG. 5 can be used to determine an optimal read location of the RFID tag 110. By using the RFID tag read data collected over a number of reads, the best physical location for RFID antennas and their measured read performance can be determined so that the best "read" of tag worn by the individual 106 can be optimized.

Figure 6:
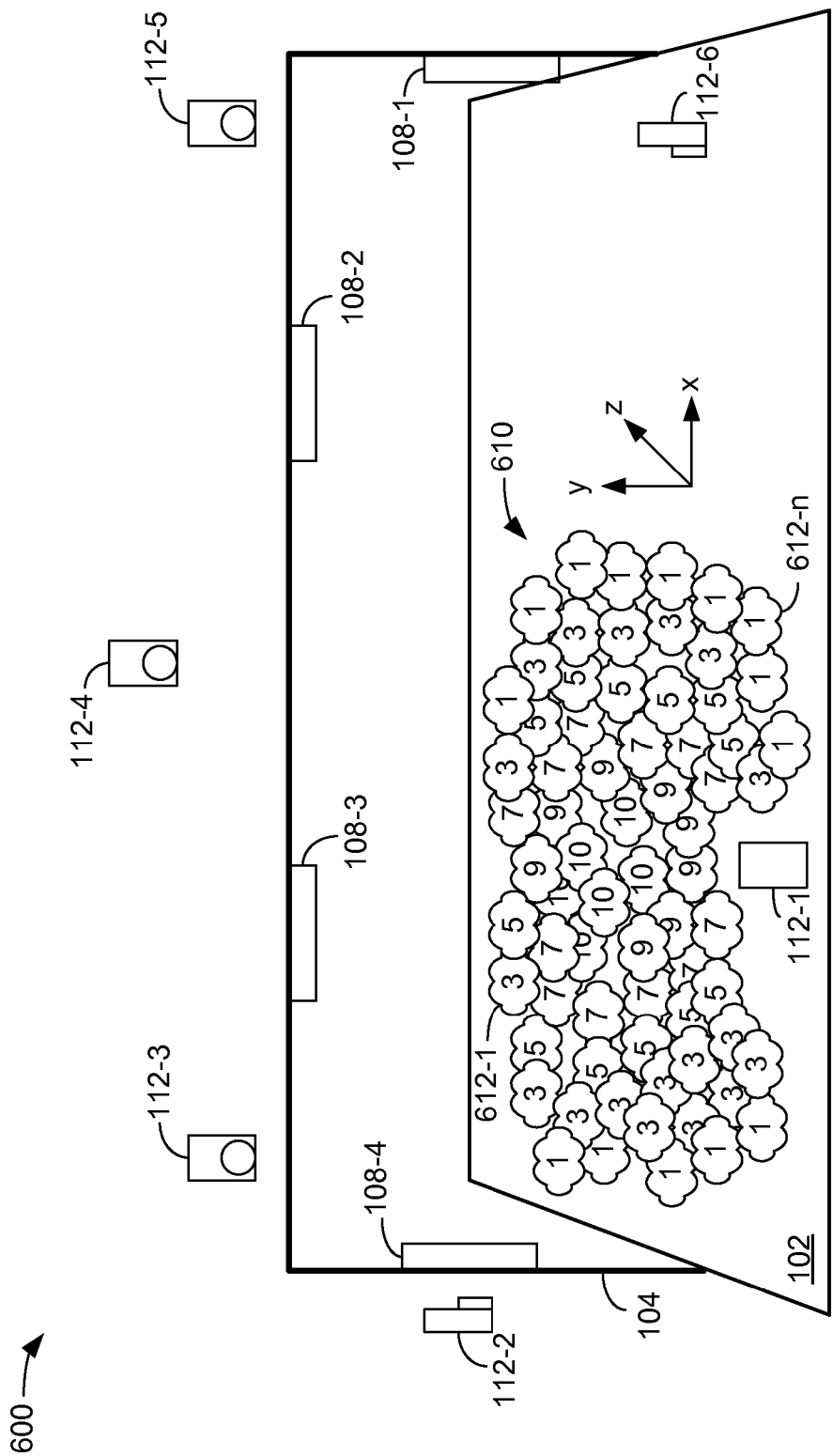
FIG. 6 is a graphical illustration showing another visualization of RFID system performance generated by the RFID motion data software of FIG. 3, relative to showing the relative signal strength within the volume.

FIG. 6 is a graphical illustration 600 showing another visualization of RFID system performance generated by the RFID motion data software 350 of FIG. 3, showing the relative signal strength within the volume 118. FIG. 6 depicts a three-dimensional cloud 610 developed over a period of time relative to the history of the locations of successful RFID read events within the volume 118. The individual clouds 612-1 through 612-n, shown spatially in the x, y and z dimensions, and representing a history of read events, carry a number indicating relative signal strength at that particular location in the volume 118 at the particular time of the read event. For example, using a scale of one (1) to ten (10) the individual clouds 612 labeled "10" show a location at which a read event occurred having a relatively strong signal signature and signal strength. Conversely, the individual clouds 612 labeled with a "1" show the locations at which a read event occurred having a relatively weak signal signature and signal strength. The numbers "3," "5" and "7" within each cloud 612 indicate a scale of relative performance. The numbers 1, 3, 5, 7 and 10 are arbitrarily chosen to indicate signal strength. Other indicators, such as color, letter, or other indicators, can also be used, thus leading to a three-dimensional visual mapping of the performance of the RFID system within the volume 118.

Figure 7:
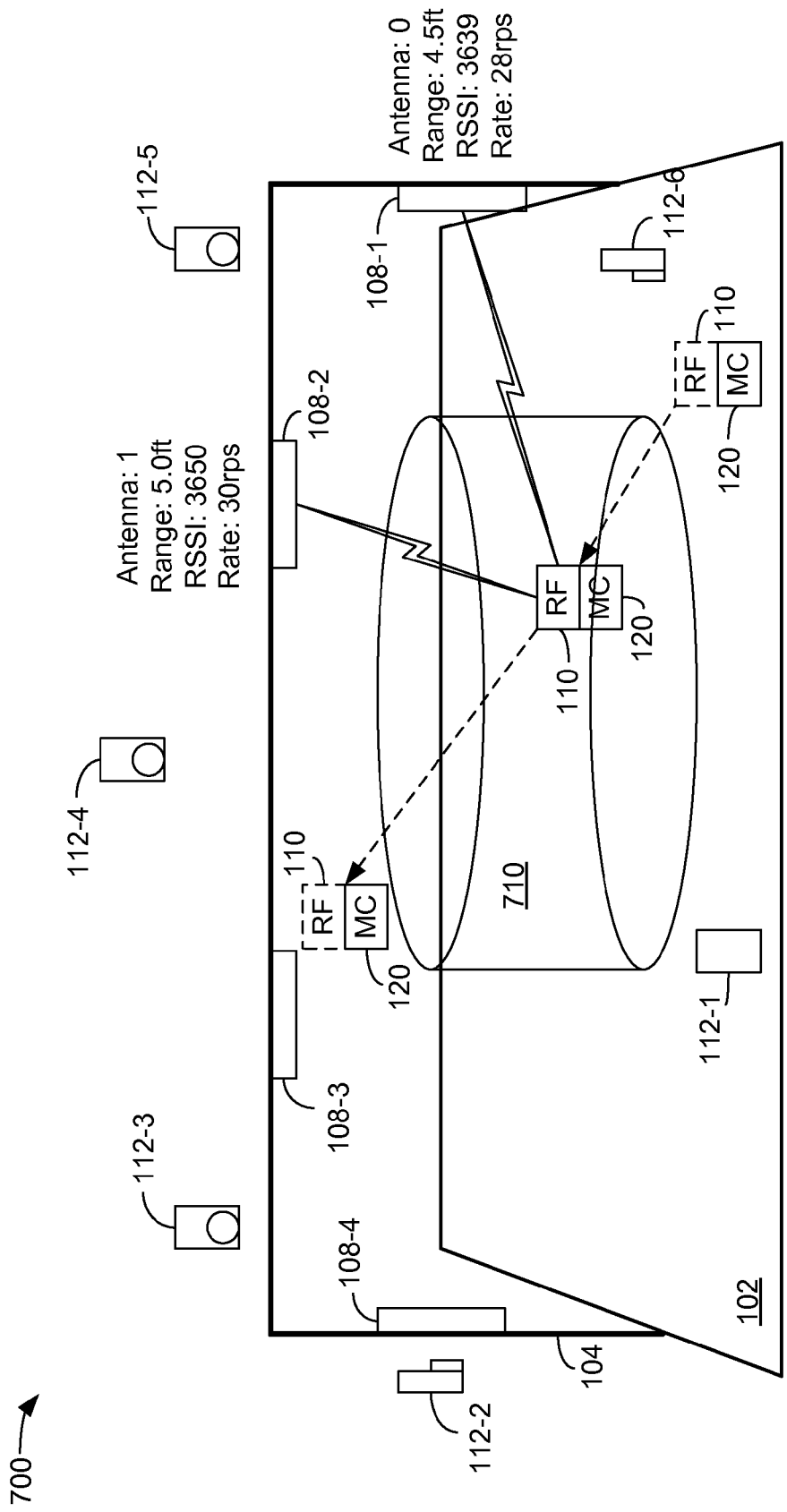
FIG. 7 is a graphical illustration showing another visualization of RFID system performance generated by the RFID motion data software of FIG. 3, relative to showing the performance of an RFID system as an RFID tag moves through a target region.

FIG. 7 is a graphical illustration 700 showing another visualization of RFID system performance generated by the RFID motion data software 350 of FIG. 3, showing the performance of an RFID system as an RFID tag 110 moves through a target region. For example, a target region 710 can be rendered within the volume 118 and can be defined by the RFID motion data software 350 so that an RFID tag 110 moving through the target region 710 is mapped and its performance noted. For example, as the RFID tag 110 moves through the target region 710, the motion capture video system 220 records the motion of the recognizable element 120 while the antenna 108-1 and the antenna 108-2 collect RFID read data, thereby providing tracking data. The tracking data can be used to determine RFID read sensitivity in the target region 710. It is also possible to record the data of the movement of the RFID tag 110 through the target region 710 for later playback and analysis.

Figure 8:
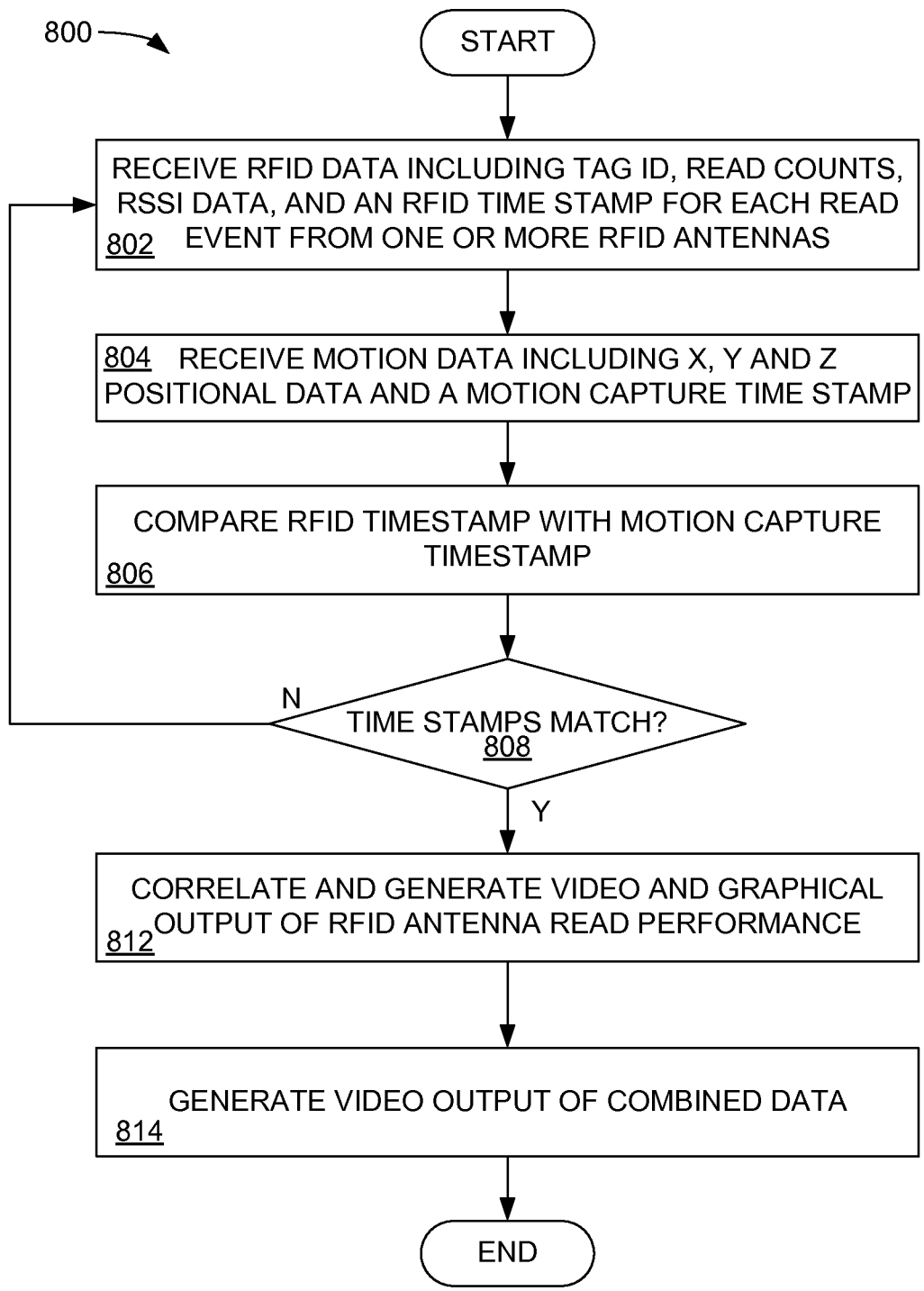
FIG. 8 is a flowchart showing the operation of an embodiment of the RFID motion data software of FIG. 3.

FIG. 8 is a flowchart 800 showing the operation of an embodiment of the RFID motion data software 350 of FIG. 3. The blocks in the flow chart 800 can be performed in or out of the order shown and at least some of the blocks may be performed in parallel. In block 802 the software 350 receives the RFID data, including tag ID, read counts, RSSI data, and an RFID time stamp for each read from one or more RFID ID antennas.

In block 804, the RFID motion data software 350 receives motion data information, including X, Y and Z position data of the recognizable element 120 and a motion capture time stamp from the motion data processor 316 (FIG. 3).

In block 806, when an RFID read is recorded, its RFID time stamp is compared with the motion capture time stamp of the most recent X, Y and Z position data from the motion capture processor 208 (FIG. 2).

In block 808 it is determined if the RFID time stamp associated with the RFID read is within a defined period of time from the motion capture time stamp associated with the motion video data. If the RFID time stamp differs from the motion capture time stamp by an amount that exceeds the predetermined amount mentioned above, then the motion capture video system is said to have lost track of the recognizable element 120, the RFID read data is discarded and the process returns to block 802. Multiple RFID tag reads may occur within the predetermined time period, however; each RFID tag read is associated with a unique RFID tag.

However, if it determined in block 808 that the RFID time stamps differs from the motion capture time stamp by an amount that is less than the predetermined amount, then the X, Y and Z position data from the motion capture video system is correlated with the RFID read data and the process proceeds to block 812.

In block 812, the RFID motion data system 350 generates a video output of RFID antenna read performance, as illustrated using the antenna monitor described above.

In block 814 the RFID motion data software 350 generates a video output using the combined data.

While various embodiments of the invention have been described, it will be apparent to those of ordinary skill in the art that many more embodiments and implementations are possible that are within the scope of the invention.

What is claimed is:

1. A system for determining radio frequency identification (REID) performance, comprising:
   an RFID/motion capture system that receives RFID data from an RFID system, the RFID/motion capture system also receiving position data relating to a motion capture system element located in close proximity with an RFID tag from a motion capture video system;
   the motion capture video system operating independently from the RFID system;
   the RFID/motion capture system correlating the RFID data from the RFID system and the position data of the motion capture system element from the motion capture video system and providing a correlated RFID and motion capture signal;
   the RFID/motion capture system utilizing the correlated RFID and motion capture signal to provide a virtual realization representing relative performance of a plurality of antennas of the RFID system.

2. The system of claim 1, wherein the correlated RFID and motion capture signal is developed by comparing an RFID time stamp associated with the RFID data with a motion capture time stamp associated with the motion capture video system and the correlated RFID and motion capture signal is provided when the RFID time stamp associated with the RFID data occurs within a predetermined time of the motion capture time stamp associated with the motion capture video system.

3. The system of claim 1, wherein the RFID data comprises RFID tag read information, tag identification information, and RFID receive signal strength indication (RSSI) information.

4. The system of claim 3, wherein the correlated RFID and motion capture signal is used to develop the virtual realization of at least one performance parameter of the RFID system by presenting to a user visual and graphical information on the at least one performance parameter of the RFID system.

5. The system of claim 4, wherein the at least one performance parameter is chosen from the RFID tag read information, and the RFID receive signal strength indication (RSSI) information.

6. The system of claim 5, wherein the virtual realization displays RF performance for each of the plurality of antennas.

7. The system of claim 5, wherein the virtual realization displays a history of RF performance for each of the plurality of antennas.

8. The system of claim 5, wherein the virtual realization displays RF performance for a definable region relative to at least one antenna.

9. A system for visualizing the performance of a radio frequency identification (RFID) system, comprising:
   an RFID/motion capture system that receives RFID data from an RFID system, the RFID/motion capture system also receiving position data relating to a motion capture system element located in close proximity with an RFID tag from a motion capture video system;
   the motion capture video system operating independently from the RFID system;
   the RFID/motion capture system correlating the RFID data from the RFID system and the position data of the motion capture system element from the motion capture video system and providing a correlated RFID and motion capture signal; and
   a user interface that develops a virtual realization of at least one performance parameter of the RFID system by presenting to a user visual and graphical information of relative performance of a plurality of antennas of the RFID system.

10. The system of claim 9, wherein the correlated RFID and motion capture signal is developed by comparing an RFID time stamp associated with the RFID data with a motion capture time stamp associated with the motion capture video system and the correlated RFID and motion capture signal is provided when the RFID time stamp associated with the RFID data occurs within a predetermined time of the motion capture time stamp associated with the motion capture video system.

11. The system of claim 9, wherein the RFID data comprises RFID tag read information, and RFID receive signal strength indication (RSSI) information.

12. The system of claim 10, wherein the user interface displays RF performance for each of the plurality of antennas.

13. The system of claim 10, wherein the user interface displays a history of RF performance for each of the plurality of antennas.

14. The system of claim 10, wherein the user interface displays RF performance for a definable region relative to at least one antenna.

15. A method for determining radio frequency identification (RFID) performance, comprising:
  receiving RFID data relating to at least one RFID tag from an RFID system;
  receiving, from a motion capture system, position data relating to a motion capture system element located in close proximity with the RFID tag;
  correlating the RFID data and the position data to provide a correlated RFID and motion capture signal; and
  utilizing the correlated RFID and motion capture signal to provide a virtual realization representing relative performance of a plurality of antennas of the RFID system.

16. The method of claim 15, wherein the correlating comprises comparing an RFID time stamp associated with the RFID data with a motion capture time stamp associated with the position data and providing the correlated RFID and motion capture signal when the RFID time stamp occurs within a predetermined time of the motion capture time stamp.

17. The method of claim 15, wherein utilizing the correlated RFID and motion capture signal to evaluate performance the RFID system comprises providing a performance parameter presented to a user comprising RFID tag read information and RFID receive signal strength indication (RSSI) information.

18. The method of claim 17, further comprising displaying RF performance for each of the plurality of antennas.

19. The method of claim 17, further comprising displaying a history of RF performance for each of the plurality of antennas.

20. The method of claim 17, further comprising displaying RF performance for a definable region relative to at least one antenna.

* * * * *